E. P. BENNETT.
WIRE BALE-TIE.

No. 188,845. Patented March 27, 1877.

Witnesses: Prentice Edgars, Chas. J. Selkirk

Edward P. Bennett
his attorney
Alex. Selkirk
Inventor

UNITED STATES PATENT OFFICE.

EDWARD P. BENNETT, OF COBLESKILL, N. Y., ASSIGNOR TO WASHBURN & MOEN MANUFACTURING COMPANY, OF WORCESTER, MASS.

IMPROVEMENT IN WIRE BALE-TIES.

Specification forming part of Letters Patent No. 188,845, dated March 27, 1877; application filed October 16, 1876.

*To all whom it may concern:*

Be it known that I, EDWARD P. BENNETT, of the town of Cobleskill, county of Schoharie, State of New York, have invented certain Improvements in Wire Bale-Ties; and I do hereby declare that the following is a description thereof, reference being had to the accompanying drawings, forming a part of this specification, in which—

Figure 1:
Figure 2:
Figure 3:
Figure 4:
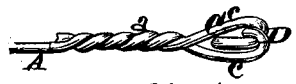
Figure 5:
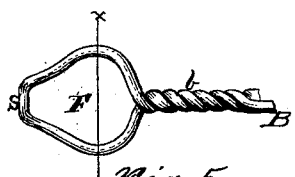
Figure 6:
Figure 7:
Figure 8:
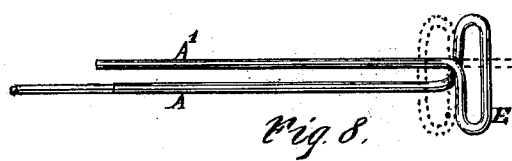
Figure 9:
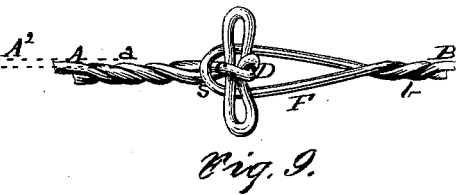
Figure 10:
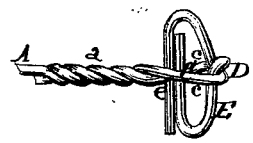

Figure 1 represents a plan view of the two connecting ends of the bale-band when attached, and illustrates the improvements in this invention. Fig. 2 is a horizontal view of the buttoning end of the tie. Fig. 3 is an end view of the same. Fig. 4 is a side view. Fig. 5 is a horizontal view of the receiving-loop end. Fig. 6 is an end view of the same. Fig. 7 is a perspective view. Fig. 8 is an illustration of the manner in which the wire is bent to form the buttoning-loop, having the essential features combined in that part of my invention. Fig. 9 is a horizontal view of the two ends of the tie when connected, after a strain has been exerted on the same. Fig. 10 is a horizontal view of the buttoning-loop modified in its form of construction.

My invention relates to a bale-tie constructed of wire, and having a buttoning device formed with one end, and a receiving-loop with the other end; and consists, in one part, of the combination, with a stirrup secured to the main strand by a twisted neck, of a transverse buttoning-loop and a half-knot, in such a manner that the said transverse loop may be securely held in the said stirrup in position to receive the strain exerted by the elastic force of the compressed bale. The object of this part of my invention is to render the side of the said transverse loop, against which the opposite end loop draws, capable of yielding before the strain, and to cause the stirrup to support the said loop, and to partially sustain the strain exerted, that all liability of parting or cutting the wire at the point drawn on may be removed.

Another part of my invention consists in a receiving-loop, secured to the opposite end of the main strand by a twisted neck, combining an upturned and contracted draft end with an enlarged opening back from said draft end, in such a manner that the said enlarged rear opening may readily receive the buttoning device from the side opposite from the contracted upturned draft end, and the said draft end may retain the buttoning device central with the receiving-loop by the neck of the stirrup being in the upturned draft end, and capable of being guided by it in the event of an end play of the buttoning end in the receiving-loop when moved in a reciprocating manner, as is incidental in baling hay in a perpetual baling-press. The object of this part of my invention is to adapt the receiving-loop for a ready insertion of the buttoning end, and the guiding of the same central with the receiving-loop when moved in a reciprocating manner, and also to render the said receiving-loop capable of readily yielding to a collapse or a straightening out of its sides when drawn on.

To enable others skilled in the art to make and use my invention, I will proceed to describe it in reference to the drawings and the letters of reference marked thereon, the same letters indicating like parts.

In the drawings, A represents one end of the wire bale-band. B is the opposite end of the same wire. Made with the end A is the stirrup C, formed by the two strands $c\ c$, Figs. 2, 3, and 4, and supported from the main strand by the twisted neck $a$. The end of the said stirrup is formed by knot D, and supports within said stirrup the loop E in a transverse position, with its rear side $e$ at the twist, and free to yield toward the said knot when drawn against. Made with the opposite end B of the band is the receiving-loop F, supported from the same by the twisted neck $b$, as shown in Figs. 1, 6, 7, and 9. The said receiving loop is made with an enlarged extension of opening at line $x$, sufficient to permit the transverse loop E to pass through the same by a slight endwise movement of the said transverse loop when inserted from the lower side, as indicated by arrow in Fig. 7. The draft end $s$ of the said receiving-loop is both contracted and upturned, as shown in Figs. 6 and 7, to form a sort of bow to receive the base of the stirrup of the buttoning end, and permit the transverse loop to be cradled on the rim of the enlarged portion of said receiving-loop, and cause the necks *a* and *b* to line with each other in a horizontal manner.

The manner I prefer to work the wire to form the buttoning end of the band is as follows: I first form the oblong loop E, as shown in Fig. 8, with the short end A$^1$ of the wire thrown past the long or main strand A, as shown. I then turn the said loop over on the main strand, as shown by dotted lines in the same figure, making the bend at the neck of the loop, when the short strand A$^1$ will be carried back, as shown by dotted line A$^2$. The said short strand is then turned from position A$^2$ over the loop shown by dotted lines, and toward and to the side of the main strand, when the oblong loop E will be held within the embrace of the strands *c c*, which form the stirrup C, by the knot D. The two strands A and A$^1$ are then twisted as shown in Figs. 2 and 4.

When the connection of the two ends is to be made, the buttoning end is to be inserted into the receiving-loop from beneath, or from the side opposite from the upturned draft end, as indicated by arrow in Fig. 7, when the transverse loop will lie across the receiving-loop at its widest part, and the base of the stirrup will rest in the contracted upturned draft end *s*, as shown in Fig. 1. When the ends of the band are thus connected the sides of the receiving-loop may readily be collapsed, or partially straightened out, by simply pulling on the strand suddenly, when the transverse loop will be prevented from escaping. When the elastic force of the compressed bale is exerted on the connected ends the free bar *e* of the transverse loop will yield before the draft, as the draft end *s* of the receiving-loop draws on the same until the said free bar is carried to the knot D, where it will have a support, as shown in Fig. 9, while at the same time the sides of the receiving-loop will become straightened out, as shown in the same figure, with the end of the said receiving-loop drawing on the stirrup, as shown.

I am aware that bale-ties composed of a button connected with a loop, both button and loop being formed of the end of the wire, are not new, and such I do not, broadly, claim.

Having described my invention, what I claim, and desire to secure by Letters Patent, is—

1. A wire bale-tie consisting of a button composed of a loop, E, formed out of the wire of the band, and encompassed by the strands of said wire bent back upon themselves and twisted together, said button being adapted to and combined with a loop, as shown, and for the purpose set forth.

2. The combination, with the stirrup C, transverse loop E, and knot D, made continuous with the main strand of a wire bale-tie, of the receiving-loop F, having a contracted and upturned draft end, *s*, and distended side strands at *x*, to form an enlarged opening to said receiving-loop, substantially as and for the purpose set forth.

EDWARD P. BENNETT.

Witnesses:
 ARCHULES KILMER,
 E. H. HANSEN.